US011169118B2

(12) United States Patent
Zhang et al.

(10) Patent No.: US 11,169,118 B2
(45) Date of Patent: Nov. 9, 2021

(54) METHOD FOR EXTENDING DETECTION RANGE OF A STRUCTURAL HEALTH MONITORING SYSTEM

(71) Applicant: Broadsens Corp., Milpitas, CA (US)

(72) Inventors: Chang Zhang, San Jose, CA (US); Lei Liu, San Ramon, CA (US)

(*) Notice: Subject to any disclaimer, the term of this patent is extended or adjusted under 35 U.S.C. 154(b) by 225 days.

(21) Appl. No.: 15/989,176

(22) Filed: May 25, 2018

(65) Prior Publication Data

US 2018/0356366 A1  Dec. 13, 2018

Related U.S. Application Data

(60) Provisional application No. 62/517,940, filed on Jun. 11, 2017.

(51) Int. Cl.
*G01N 29/04* (2006.01)
*G01N 29/40* (2006.01)
*G01N 29/44* (2006.01)
*G01N 29/24* (2006.01)

(52) U.S. Cl.
CPC .......... *G01N 29/04* (2013.01); *G01N 29/043* (2013.01); *G01N 29/2475* (2013.01); *G01N 29/40* (2013.01); *G01N 29/4427* (2013.01); *G01N 2291/0289* (2013.01)

(58) Field of Classification Search
CPC ...... G01N 29/04; G01N 29/40; G01N 29/069; G01N 29/07; G01N 29/4427; G01N 29/2475; G01N 29/262; G01N 29/043
See application file for complete search history.

(56) References Cited

U.S. PATENT DOCUMENTS

| | | | | |
|---|---|---|---|---|
| 4,299,128 A | * | 11/1981 | Gruber | G01N 29/07 73/627 |
| 4,918,993 A | * | 4/1990 | Hughson | G01N 3/08 73/587 |
| 6,023,975 A | * | 2/2000 | Willis | G01N 29/12 73/579 |
| 7,103,507 B2 | * | 9/2006 | Gorinevsky | G05B 23/0213 701/29.4 |
| 8,707,787 B1 | * | 4/2014 | Sohn | G01N 29/4418 73/597 |
| 8,892,384 B2 | * | 11/2014 | Pado | G01M 7/00 702/104 |
| 9,038,469 B2 | * | 5/2015 | Sohn | G01N 29/4472 73/598 |
| 9,127,998 B1 | * | 9/2015 | Guldiken | G01L 5/246 |
| 2004/0245315 A1 | * | 12/2004 | Maev | G01N 29/262 228/8 |
| 2005/0183505 A1 | * | 8/2005 | Kono | G01N 29/262 73/597 |
| 2005/0228597 A1 | * | 10/2005 | Giurgiutiu | G01N 29/041 702/35 |

(Continued)

*Primary Examiner* — Helen C Kwok
(74) *Attorney, Agent, or Firm* — Jigang Jin

(57) ABSTRACT

The present invention discloses a method for extending the detection range of a structural health monitoring (SHM) system. A structure being monitored is scanned multiple times. A scan with no collection delay covers an original detection area of the SHM system. Scans with collection delays cover extended detection areas. The SHM system's detection range is extended when results of multiple scans with different collection delays are combined.

11 Claims, 5 Drawing Sheets

(56) References Cited

U.S. PATENT DOCUMENTS

| | | | |
|---|---|---|---|
| 2006/0065055 A1* | 3/2006 | Barshinger | G01N 29/043 73/609 |
| 2006/0095223 A1* | 5/2006 | Gordon | G01N 29/07 702/116 |
| 2006/0265146 A1* | 11/2006 | Gorinevsky | G05B 23/0221 702/39 |
| 2007/0225930 A1* | 9/2007 | Kwun | G01N 29/42 702/109 |
| 2008/0022773 A1* | 1/2008 | McKenna | G01N 29/346 73/597 |
| 2008/0127732 A1* | 6/2008 | Owens | G01N 29/043 73/632 |
| 2008/0255803 A1* | 10/2008 | Beard | G01N 29/041 702/181 |
| 2009/0048789 A1* | 2/2009 | Yu | G01N 29/069 702/39 |
| 2009/0322557 A1* | 12/2009 | Robb | G01M 5/0033 340/870.3 |
| 2010/0079258 A1* | 4/2010 | Ihn | G01N 29/043 340/10.41 |
| 2010/0206080 A1* | 8/2010 | Ruzzene | G01S 15/88 73/618 |
| 2010/0217544 A1* | 8/2010 | Yan | G01N 29/346 702/56 |
| 2010/0312493 A1* | 12/2010 | Purekar | G01N 29/2437 702/35 |
| 2010/0319455 A1* | 12/2010 | Ihn | G01N 29/069 73/603 |
| 2011/0058453 A1* | 3/2011 | Hedi | G01N 29/069 367/103 |
| 2012/0025827 A1* | 2/2012 | Tralshawala | G01R 33/441 324/310 |
| 2012/0053852 A1* | 3/2012 | Padilla | G01N 29/4445 702/34 |
| 2012/0203474 A1* | 8/2012 | Kawiecki | G01N 29/07 702/39 |
| 2012/0255359 A1* | 10/2012 | Sohn | G01N 29/2475 73/598 |
| 2013/0055816 A1* | 3/2013 | Masson | G01N 29/069 73/598 |
| 2013/0096881 A1* | 4/2013 | Jauriqui | G01N 29/043 702/189 |
| 2013/0197823 A1* | 8/2013 | Williams | G01N 29/38 702/39 |
| 2013/0314260 A1* | 11/2013 | Gemmeke | G01N 29/4454 341/87 |
| 2014/0025316 A1* | 1/2014 | Harley | G01N 29/44 702/35 |
| 2014/0157898 A1* | 6/2014 | Ruzzene | G01N 29/245 73/579 |
| 2015/0040671 A1* | 2/2015 | Malladi | G01N 29/041 73/597 |
| 2015/0049580 A1* | 2/2015 | Skoglund | G01N 29/043 367/7 |
| 2015/0168352 A1* | 6/2015 | Sohn | F03D 17/00 73/643 |
| 2015/0300995 A1* | 10/2015 | Flynn | G01N 29/46 73/602 |
| 2016/0023772 A1* | 1/2016 | Borigo | B64D 15/163 134/1 |
| 2016/0034422 A1* | 2/2016 | Brandt | G01N 29/4454 708/424 |
| 2016/0109412 A1* | 4/2016 | Borigo | G01N 29/262 73/598 |
| 2016/0274062 A1* | 9/2016 | Takahashi | G01N 29/348 |
| 2016/0282308 A1* | 9/2016 | Mofakhami | B64D 45/00 |
| 2016/0299106 A1* | 10/2016 | Khajeh | G01N 29/262 |
| 2017/0126332 A1* | 5/2017 | Biswas | H04W 56/0015 |
| 2018/0156907 A1* | 6/2018 | Cegla | G01S 13/22 |
| 2018/0164383 A1* | 6/2018 | Hsieh | B60L 58/16 |
| 2018/0328892 A1* | 11/2018 | Tansel | G01N 29/262 |
| 2019/0053786 A1* | 2/2019 | Qiu | A61B 8/56 |
| 2019/0383695 A1* | 12/2019 | Yao | G01N 29/4454 |
| 2020/0072040 A1* | 3/2020 | Liu | E21B 47/047 |

\* cited by examiner

METHOD FOR EXTENDING DETECTION RANGE OF A STRUCTURAL HEALTH MONITORING SYSTEM

CROSS-REFERENCE TO RELATED APPLICATION

This application claims priority to U.S. provisional patent application Ser. No. 62/517,940, filed Jun. 11, 2017, the entire content of which is incorporated herein by reference.

FIELD OF INVENTION

This invention generally relates to the field of structural health monitoring ("SHM").

BACKGROUND OF THE INVENTION

SHM involves the process of implementing a damage detection and characterization strategy for engineering structures. Such damages may include changes to the material and/or geometric properties of a structural system as well as changes to the boundary conditions and system connectivity, which adversely affect the structural system's performance. The monitoring process may include the observation of a system over time using periodically sampled dynamic response measurements from an array of sensors, the extraction of damage-sensitive features from these measurements, and the statistical analysis of these features to determine the current state of system health.

Currently, a SHM system includes data acquisition devices and at least one processing device, such as a computer, that is separate from the data acquisition devices, or integrated with the data acquisition device together. These data acquisition devices are usually mounted onto or installed near a structure to be monitored. In passive mode SHM systems, these data acquisition devices include in-situ sensors which listen to the changes continuously or periodically. In active mode SHM systems, however, these data acquisition devices include not only in-situ sensors but also actuators. The actuators generate actuation signals and send the actuation signals to the structure, whereas the in-situ sensors listen to the actuation signals and send back sensor signals for measurement. The signals received are analyzed to determine the status of the structure. When the structure is normal, the signals are used as baseline data. When the structure has defects or changes, the signals would be different from the baseline data. An in-situ actuator transmits signals, while an in-situ sensor receives signals. An actuator and a sensor may be integrated. Alternatively, they may be separate devices and used as a group where the actuator is used to transmit signals and the sensor is used to receive signals.

Prior-art SHM systems can only cover a limited space. When a structure to be monitored is larger than that limit, additional actuators and sensors are added. This solution increases the installation complexity, weight, size and cost of the SHM system. Another solution is to increase the memory capacity of the SHM system to increase the maximum data acquisition time to reach further distance. However, due to size and speed requirements on memory units used in SHM systems, especially real-time SHM systems, this solution also adds substantial cost. Thus, there exists a need to extend the detection range of a SHM system without adding additional actuators and sensors or without upgrading the memory capacity.

SUMMARY OF THE INVENTION

The present invention discloses a method that increases a SHM system's detection range via multiple scans and different collection delays. In one embodiment, a SHM system scans a structure being monitored multiple times. During the first scan, signal collection at the sensor(s) starts immediately after actuation signals are transmitted to the structure. During the second scan, signal collection at the sensor(s) is delayed for a period of time after actuation signals are transmitted (hereinafter, "collection delay"). Subsequent scans may be added with different (e.g., incremental) collection delays. The first scan, which does not have any collection delay, covers an area that can be reached by the original detection range of the SHM system. Scans with collection delays cover areas beyond the original detection range. Multiple scans with different collection delays may increase the detection range of a SHM system and enable the system to monitor a larger area of a structure without upgrading the memory or adding additional actuators and sensors.

In one embodiment of the invention, collection delays are adjusted by a delay mechanism. In another embodiment of the invention, weak signals received are compensated by increasing the receiver gain level to increase the signal to noise ratio. In other embodiments, a SHM system comprises an actuator and a sensor, multiple actuators and a sensor, an actuator and multiple sensors, multiple actuators and multiple sensors, or groups of actuators and sensors.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
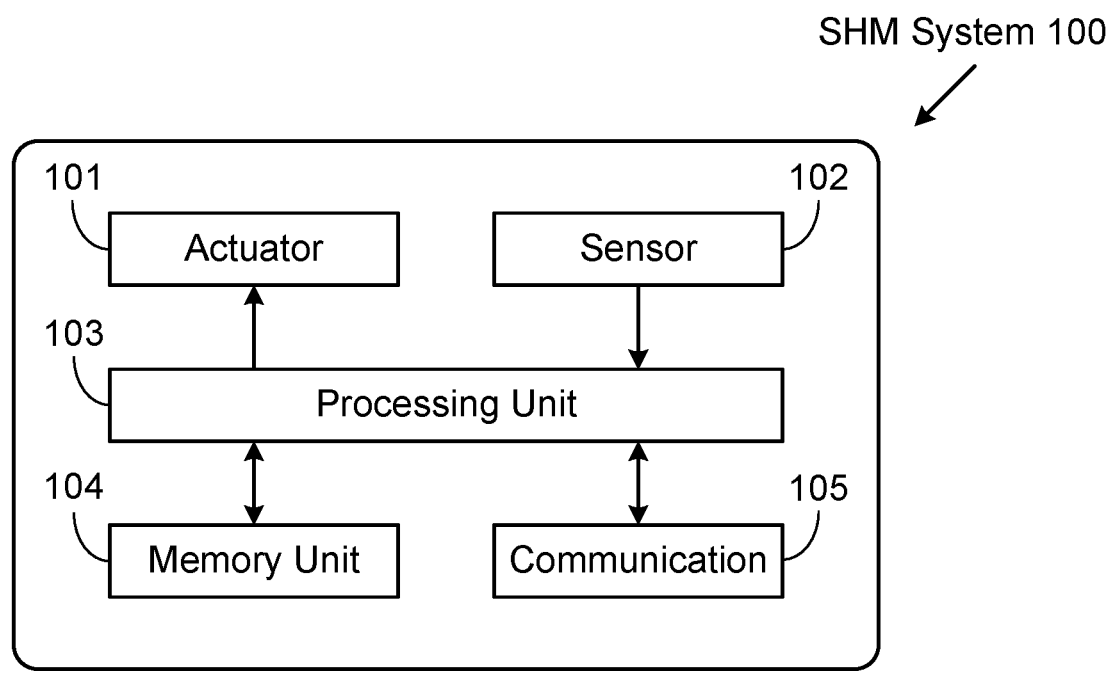
FIG. 1 is a block diagram of a prior-art SHM system.

FIG. 1 is a block diagram of a prior-art SHM system 100. As shown, system 100 includes an actuator 101, a sensor 102, a processing unit 103, a memory unit 104, and a communication unit 105. Actuator 101 and sensor 102 may be piezoelectric or electromagnetic transducers. During operation, processing unit 103 controls actuator 101 which sends actuation signals to a structure being monitored. At the same time, processing unit 103 instructs sensor 102 to immediately start collecting response signals (i.e., the structure's response to the actuation signals including, for example, reflected actuation signals, refracted actuation signals, pass-through actuation signals), and convert the response signals into data which is then stored in the memory unit 104. The collection of response signals and convert them into data is also known as data acquisition. Measurement results may be transmitted to other devices via communication unit 105. System 100 may comprise more actuators and sensors to monitor a larger area.

Figure 2:
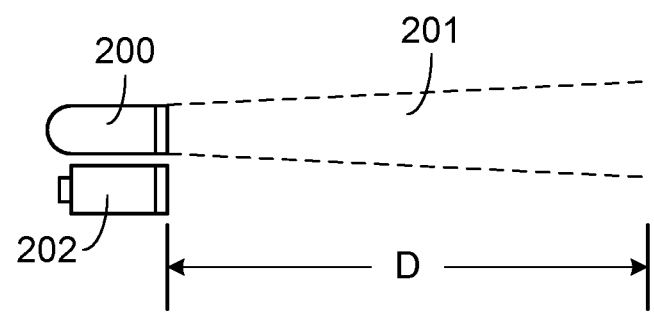
FIG. 2 illustrates a configuration of an actuator and a sensor in a prior-art SHM system.

FIG. 2 shows a configuration of an actuator 200 and a sensor 202 of a prior-art SHM system. The actuator 200 and the sensor 202 are positioned closely to each other. The actuator 200 generates and transmits actuation signals 201, such as ultrasonic waves, to a structure (not shown). The sensor 202 detects response signals (e.g., the reflected actuation signals) from the structure. Assuming the structure has a homogeneous medium, the actuation signals 201 travel at a constant speed. The signals are distorted and reflected when interacting with obstacles, damages, or structure borders. Sensor 202 receives the reflected actuation signals, converts the response signals into data, and transmits the data to a processing unit of the system. The processing unit processes the data to determine the changes and damages of a structure being monitored.

To cover an area having a distance D from the sensor, the sensor 202 needs to start collecting response signals when the actuation signals are generated and transmitted by the actuator 200. The sensor 202 stops data acquisition after receiving response signals from the distance D. Assuming that the actuation signals 201 have an adequate duration (window) so that enough information may be obtained for structural analysis, the following formula is obtained:

$$T_s = L*2/v + T_w \tag{1}$$

where L is the distance between the actuator plus sensor and the point of interest in a structure, v is the signal speed traveling through the structure, $T_w$ is the duration (window) of the actuation signal, and $T_s$ is the signal duration in which the sensor needs to collect data. The signal speed v is constant in a homogeneous structure. For a non-homogeneous structure, the signal speed v may vary along different directions and at different locations. In practice, $T_s$ may be measured by experiments or obtained by structural models and the signal speed v at equation (1) may be the average signal speed with regard to the point of interest.

The number of samples needs to be collected for structural analysis may be represented as $$N = T_s * S \tag{2}$$

where N is the number of samples to be collected and S is the sampling rate.

The lowest sampling rate that may be used is called the Nyquist frequency, which is twice the actuation signal frequency. In SHM measurements, a much higher sampling rate than the Nyquist frequency is needed for effective damage detections. The maximum number of samples to be collected is limited by the size of the memory unit in a SHM system. As such, the signal duration $T_s$ that the sensor may use is limited by the size of the memory unit. Consequently, the distance from the actuator plus sensor to a point of interest is also limited, which means the detection range of the actuator and sensor is limited as well. Thus the SHM system has a limited detection range and only works for structures smaller than a certain size. To monitor a structure beyond the size limit, a SHM system needs a larger memory or additional actuators and sensors, both of which add substantial cost.

The present invention discloses a method which increases the detection range of a SHM system without memory increase or adding additional actuators and/or sensors. During a monitoring process, a structure being monitored is scanned multiple times consecutively. A scan having no collection delay covers an original detection area of the SHM system. A scan having a collection delay covers an extended detection area. Combining results of the scans enlarges the detection range of the SHM system.

If there is no collection delay in data acquisition, or the collection of response signals starts immediately after actuation signals are transmitted to a structure, the maximum distance $L_0$ of a scan can be represented by $$L_0 = (T_s - T_w) * v/2 \tag{3}$$

wherein, points at measurement distance L ($0 <= L <= L_0$) are covered in the data acquisition.

If a sensor collects response signals with a collection delay d in response to the transmission of actuation signals, i.e., the sensor waits for a period of time d before collecting response signals, then the starting distance from which data acquisition occurs is:

$$L_d = d * v/2 \tag{4}$$

Thus, the detection distance is extended from $L_0$ to $L_d + L_0$ and the area between $L_d$ and $L_d + L_0$ is covered as a result of collection delay d.

If the following collection delay is chosen $$d_1 = d = L_0 * 2/v \tag{5}$$

then, $L_{d1} = L_0$, and the measurement distance becomes L ($L_0 <= L <= 2 L_0$). Thus, the farthest measurement distance becomes $2L_0$.

Figure 3:
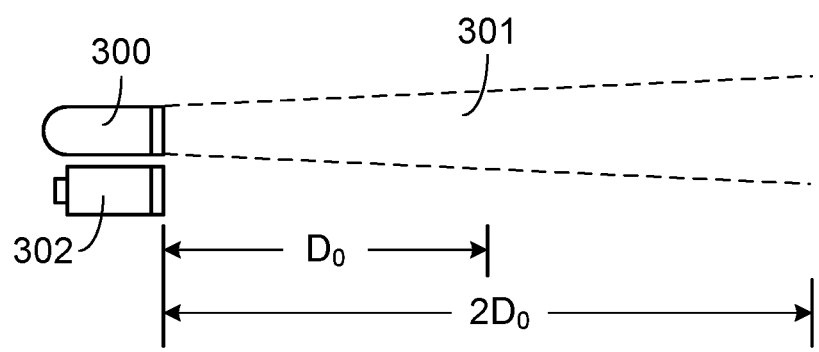
FIG. 3 is an exemplary configuration of an actuator and a sensor having an increased detection range, according to one embodiment of the present invention.

If a structure is scanned twice, one without a collection delay and the other with a collection delay specified by equation (5), and the results are combined, the detection range is doubled and becomes $2L_0$. Accordingly, the measurement distance becomes L ($0 <= L <= 2L_0$). FIG. 3 shows an exemplary configuration including an actuator 300 and a sensor 302. Actuator 300 generates ultrasonic waves 301 as actuation signals. Without a collection delay mechanism, the detection range of the sensor 302 is $D_0$. When a collection delay mechanism is added, the detection range may be increased to $2D_0$ according to the principle discussed above. The collection delay mechanism allows multiple scans with incremental collection delays to extend the detection range.

To increase the detection range further, additional scan with the following collection delay may be performed:

$$d_2 = 2d = (L_0 * 2/v) * 2 \tag{6}$$

As such, $L_{d2} = 2L_0$. Combined with the previous two scans, the detection range is tripled. The resulting measurement distance becomes L ($0 <= L <= 3L_0$).

In addition, more additional scans may be performed. In one embodiment, each additional scan's collection delay is given as below:

$$d_n = nd = L_0 * 2 * n/v \tag{7}$$

where, n=1, 2, 3, . . . . As such, $L_{dn} = nL_0$. Consequently, when combining the results of all scans, the measurement distance becomes L ($0 <= L <= (n+1) L_0$).

It should be noted that when collection delays $d_1, d_2, \ldots, d_n$ are applied, their values may not be necessarily specified by equations (5), (6), and (7). The collection delays may have other values depending on the actual needs. For instance, the value of a collection delay may be less than the value defined by equation (7). In such a case, an overlap is created between two scan areas. Overlapped scan areas may be used to ascertain a region with more details.

As the detection range is extended, actuation signals travel farther. Thus, the reflected actuation signals may experience some energy loss. Gains may be adjusted to compensate for the loss and enhance the reflected actuation signals. For instance, different gains may be preset for each scan. Furthermore, a SHM system may be arranged to adjust the gain of a signal automatically based on the signal's characteristics.

In one embodiment, the gain is adjusted such that the absolute maximum value of a signal is within a certain interval in an input range of data acquisition. For instance, the interval may be set at a range from 40% to 75%. The lower limit of the interval guarantees that signals are strong enough, and the upper limit of the interval gives enough space for signals to change without saturation. The lower and the upper limits may have other values depending on applications. It should be noted that signals collected may be filtered with various methods to overcome a noisy background. Hence, the absolute maximum value may be smoothed. For instance, exponentially weighted moving average method may be used to smooth the data. An automatic gain adjustment procedure is introduced as follows. After reflected actuation signals are received, the absolute maximum value of the signals is compared with the lower and upper limits of the interval. If the absolute maximum value is below the lower limit, the gain is increased to boost up the signal. If the absolute maximum value is above the upper limit, the gain is decreased to reduce the signal power. In one embodiment, the gain is increased according to the following formula if the absolute maximum value is below the lower limit $$g_{t+1} = g_t + \frac{1}{2} * g_t \quad (8)$$

and decreased by the following formula if the absolute maximum value is above the upper limit $$g_{t+1} = g_t - \frac{1}{2} * g_t \quad (9)$$

until the absolute maximum value falls within the interval. It should be noted that the automatic gain adjustment may be performed by different methods and the gain adjustment value may be different from what is defined by formulas (8) and (9).

The present invention may be implemented using actuators and sensors in various configurations. As aforementioned, a SHM system may comprise an actuator and a sensor which are integrated. The system may also comprise an actuator and a sensor which are separated. In the following descriptions, one or more discrete actuators and sensors are used to illustrate principles which improve the detection range of a SHM system. It should be noted that the pulse echo mode is applicable for embodiments discussed and embodiments to be described in the following.

Figure 4:
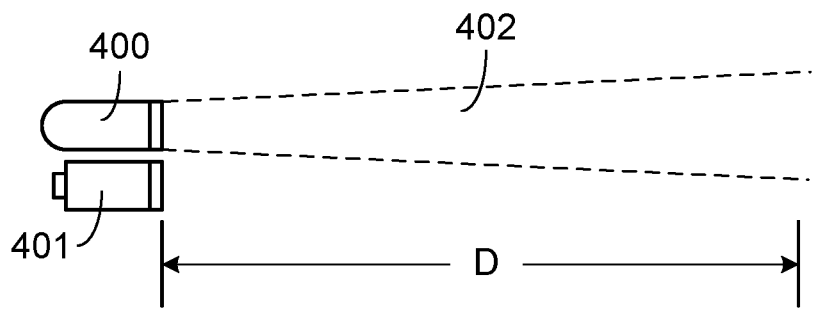
FIG. 4 is an exemplary configuration of an actuator and a sensor having an increased detection range, according to one embodiment of the present invention.

In one embodiment, as shown in FIG. 4, a SHM system may comprise an actuator 400 and a sensor 401. The actuator and sensor are placed side by side as a group with a given distance between them. Actuator 400 transmits ultrasonic waves 402 which travel through a structure. Sensor 401 receives the reflected actuation signals. Assume that the detection range is D. When a target is a one-dimensional structure, such as a pole or a pipe, actuator 400 and sensor 401 may be installed at one end of the structure. The ultrasonic waves may propagate along one direction to the other end of the structure and travel back after being reflected. The system may have a delay mechanism to implement multiple scans, process reflected actuation signals, and combine results of the scans. The scans may have incremental collection delays to extend the detection range to cover the entire length of the structure. The system may also have a compensation mechanism which adjusts gains for each scan automatically and compensates the energy loss of each case. After measurement results of the scans are combined, a larger area may be covered, and a larger part of the structure may be monitored without increase of the memory size of the SHM system or adding additional actuators and sensors.

In another embodiment, a SHM system may comprise an actuator, multiple sensors, a delay mechanism, and a compensation mechanism. The actuator and sensors may be placed in a structure as a group with given orientations and given distances between them. It should be noted that the given distances may have the same or different values. The sensors may take data simultaneously or successively. The system may perform multiple scans to extend the detection range using the delay mechanism. The scans may have incremental collection delays. Reflected actuation signals may be compensated by gain adjustment via the compensation mechanism. The system may ascertain structural conditions and changes in two or three dimensions by analyzing the phase and amplitude of the reflected actuation signals which are collected by the sensors. Again, the detection range may be increased and detection areas in a structure may be enlarged as a result of using multiple scans and incremental collection delays.

Figure 5:
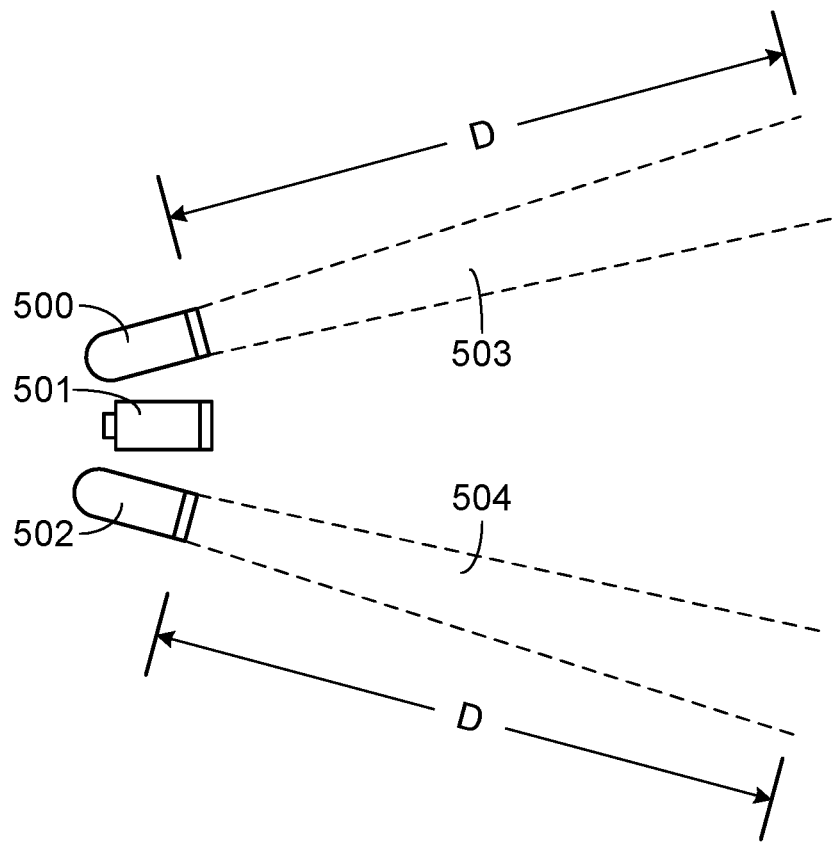
FIG. 5 is an exemplary configuration of two actuators and one sensor having increased detection ranges, according to one embodiment of the present invention.

In yet another embodiment, a SHM system may comprise multiple actuators, a sensor, a delay mechanism, and a compensation mechanism. The actuators and sensor may work together as a group and be placed at given locations with given orientations in a structure. FIG. 5 shows an exemplary configuration which has actuators 500 and 502 and a sensor 501. The actuators have different orientations and generate ultrasonic waves 503 and 504 toward different directions. Again, assume that the detection range is D. The actuators may have the same or different distances to sensor 501. Actuators 500 and 502 transmit the waves at different times and the waves may have the same or different energy levels. Multiple actuators may enable the system to observe structural changes in two or three dimensions. Phase difference and amplitude difference among reflected actuation signals from a structure may be analyzed. Again, the system may use the delay mechanism and compensation mechanism to conduct scans with incremental collection delays, compensate the reflected actuation signals, and extend the detection range to cover a larger area in the structure without any costly upgrade.

Figure 6:
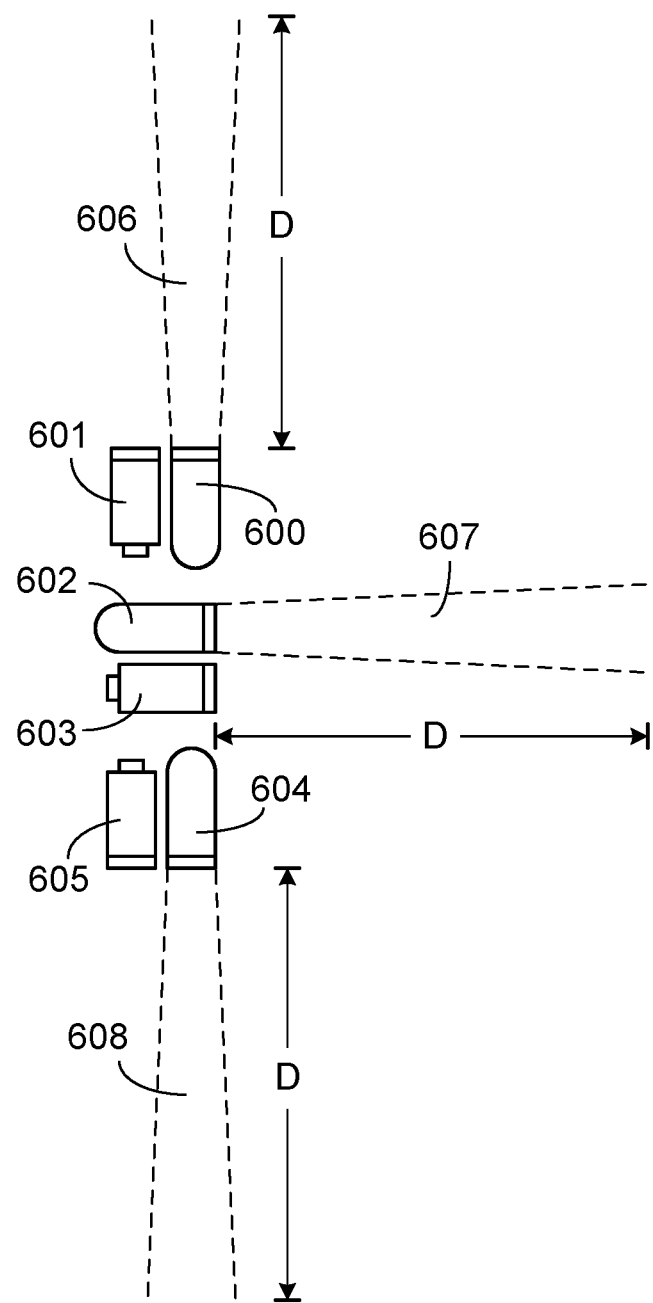
FIG. 6 is an exemplary configuration of multiple actuators and multiple sensors having increased detection ranges, according to one embodiment of the present invention.

In yet another embodiment, a SHM system may comprise multiple actuators, multiple sensors, a delay mechanism, and a compensation mechanism. The actuators and sensors may work together as a group and be positioned at given locations with predetermined orientations in a structure. The distance between an actuator and a corresponding sensor may be defined according to actual needs. FIG. 6 is an example of the embodiment. Actuators 600, 602 and 604 transmit ultrasonic waves 606, 607, and 608 respectively. The waves propagate toward different directions in a two-dimensional plane. The actuators may also be placed to generate waves in a three-dimensional space. Sensors 601, 603, and 605 pair with the actuators respectively. Again, let D represent the detection range. The actuators may transmit the waves at the same or different times and with the same or different energy levels. The sensors may receive the reflected actuation signals in sequence or in parallel. The system may be used to identify structural changes in two or three dimensions. Phase difference and amplitude difference of the reflected actuation signals may be analyzed. Again, the delay mechanism and compensation mechanism may enable the system to extend the detection range by conducting multiple scans with incremental collection delays and performing appropriate gain adjustments. By combining measurement results of multiple scans with the collection delays, the system may increase the detection range and cover a larger area without upgrading the memory or adding additional actuators and sensors.

In yet another embodiment, a SHM system may have multiple groups located in given areas of a structure. Each group may comprise a configuration of actuator and sensor, such as an actuator and sensor, an actuator and multiple sensors, multiple actuators and a sensor, or multiple actuators and multiple sensors, or a combination of any two or more of the configurations. Each group may monitor a given part of the structure. Measurement results from all groups may cover different areas of the structure. There may be overlaps between groups for redundant coverage. Again, each group or the system may have a delay mechanism and a compensation mechanism. The delay mechanism is used to perform multiple scans with incremental collection delays. The compensation mechanism is used to provide proper gains for reflected actuation signals. The detection range of each group may be extended by combining measurement results of the scans. The system may cover additional areas in the structure without increasing the memory size or installing more actuators and sensors.

In aforementioned embodiments, beam-forming techniques may be used to fine tune the characteristics and pointing direction of ultrasonic waves so that areas of interest may receive optimized power of actuation signals respectively. A delay mechanism may be designed to adjust a collection delay automatically based on the waveform speed or signal transmission speed in a structure and the location of an area being monitored.

Figure 7:
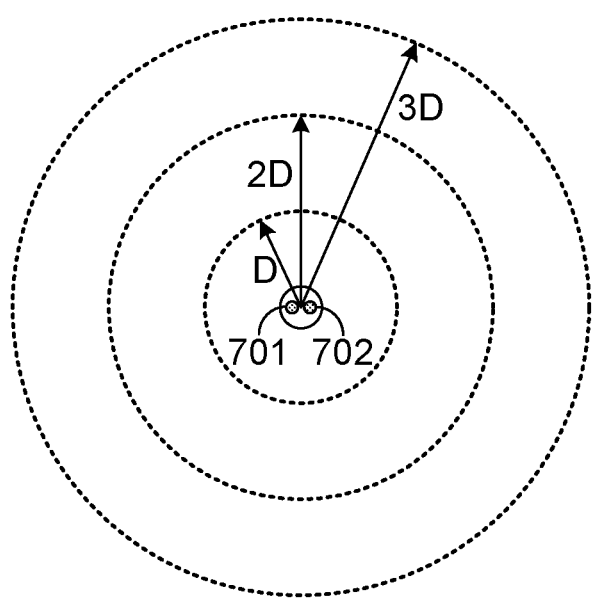
FIG. 7 is an exemplary configuration of one actuator and one sensor having increased detection ranges, according to one embodiment of the present invention.

In yet another embodiment, the actuator and sensor can send/listen actuation signals (e.g., ultrasonic waveforms) to cover a two-dimensional circular area. FIG. 7 illustrates an example where the actuator 701 and sensor 702 are configured to send and listen ultrasonic waveforms to cover a two-dimensional circular area. That is, the waveform goes out uniformly in 360 degrees. Assuming the detection range of the actuator 701 and sensor 702 is a circular area with a radius D, the present invention can extend the detection range to a circular area with a radius 2D, 3D, or even larger, by using multiple scans with collection delays described above. This configuration is very useful when the structure to be monitored is a thin flat plate. It should be noted that this method also works when the waveform speed is different at different angles or locations. In that case, an experimental method is used to measure the waveform speed at different directions and locations.

In yet another embodiment, the actuator and sensor can send/listen actuation signals (e.g., ultrasonic waveforms) to cover a three-dimensional spherical area. Specifically, the actuator and sensor are configured to send and listen ultrasonic waveforms to cover a three-dimensional spherical area. That is, the waveform goes out uniformly in 360 degrees in three-dimensional directions. Similar to the above embodiments, by using multiple scans with collection delays, the present invention can extend the detection range of the actuator and sensor from a radius of D to a radius of 2D, 3D, or more. It should be noted that this method also works when the waveform speed is different at different angles or locations. In that case, an experimental method is used to measure the waveform speed at different directions and locations.

It should also be noted that the present invention is not limited to reflected waves or waveforms, waves or waveforms produced by pass-through, refraction, or diffraction may also be collected and used by a SHM system to perform damage analysis.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for increasing a structural health monitoring system's detection range when monitoring a structure, the method comprising:
    transmitting from an actuator of the structural health monitoring system a first actuation signal to the structure in a first scan;
    after a first time period that begins from transmitting the first actuation signal, starting collecting at a sensor of the structural health monitoring system first response signals from the structure in response to the first actuation signal to cover a first detection range from the sensor;
    converting the first response signals into first structural health data;
    transmitting from the actuator a second actuation signal to the structure in a subsequent second scan;
    after a second time period that begins from transmitting the second actuation signal, starting collecting at the sensor of the structural health monitoring system second response signals from the structure in response to the second actuation signal to cover a second detection range from the sensor, wherein the second time period is set longer than the first time period so that the second detection range is further away from the sensor than the first detection range;
    converting the second response signals into second structural health data; and
    combining the first structural health data obtained in the first scan and the second structural health data obtained in the second scan into final structural health data.

2. The method of claim 1 further comprising analyzing the first response signals.

3. The method of claim 2, wherein the final structural health data comprises information regarding structure status of the structure.

4. The method of claim 1, wherein a value of the first time period is zero.

5. The method of claim 1 further comprising transmitting from the actuator a third actuation signal to the structure in a subsequent third scan; after a third time period that begins from transmitting the third actuation signal, starting collecting at the sensor of the structural health monitoring system third response signals from the structure in response to the third actuation signal to cover a third detection range from the sensor, wherein the third time period is set longer than the second time period so that the third detection range is further away from the sensor than the second detection range.

6. The method of claim 1, wherein the first and second time periods are adjusted automatically based on signal transmission speed in the structure, location of the actuator, and location of the sensor.

7. The method of claim 1 further comprising increasing gains of the first and second response signals to compensate for signal loss during transmission.

8. The method of claim 7, wherein the gains are automatically adjusted based on amplitudes of the first and second response signals.

9. The method of claim 1, wherein the first and second actuation signals comprise ultrasonic waveforms.

10. The method of claim 1, wherein the actuator and the sensor are used to cover at least one direction into the structure.

11. The method of claim 1, wherein the first detection range and the second detection range overlap each other.

* * * * *